Nov. 12, 1968

P. S. MOLLER 3,410,507

AIRCRAFT

Filed May 6, 1966

INVENTOR.
PAUL S. MOLLER

BY

Lothrop & West
ATTORNEYS

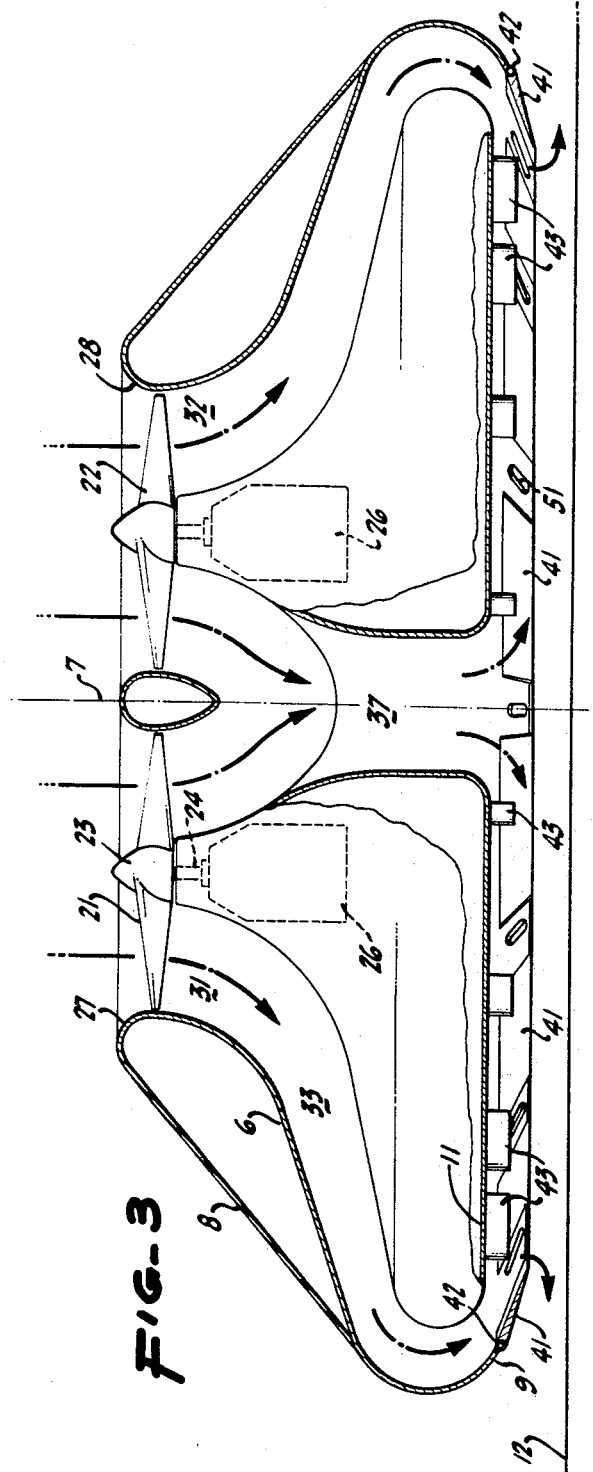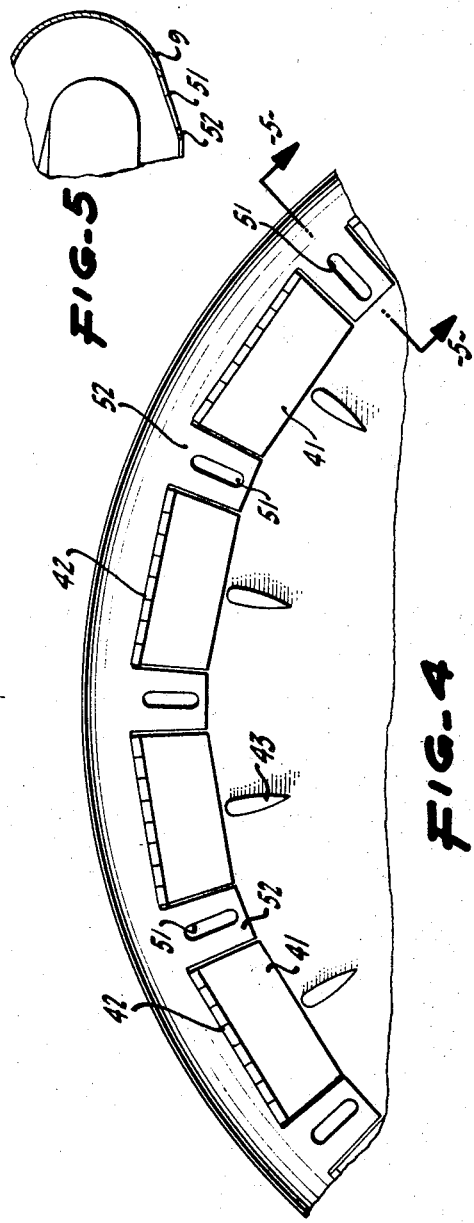

Nov. 12, 1968

P. S. MOLLER 3,410,507

AIRCRAFT

Filed May 6, 1966

INVENTOR.
PAUL S. MOLLER

BY

Lothrop & West
ATTORNEYS

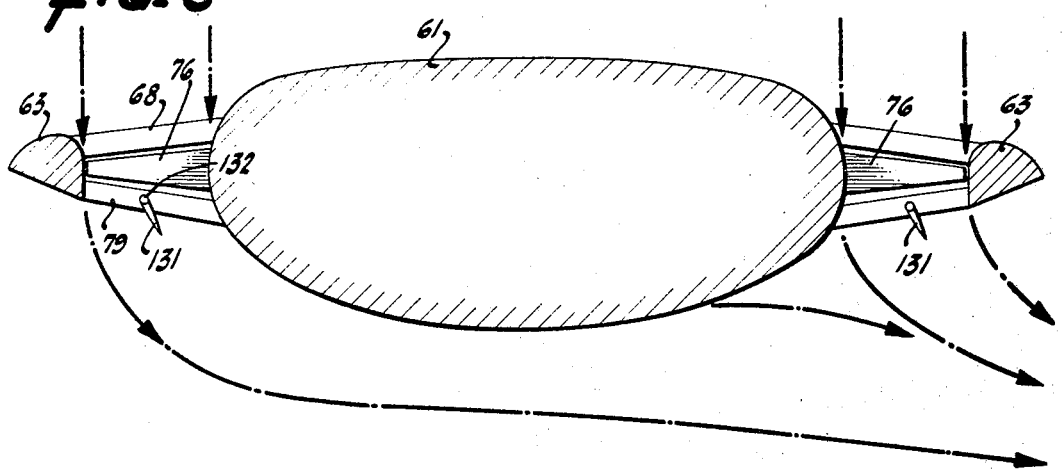
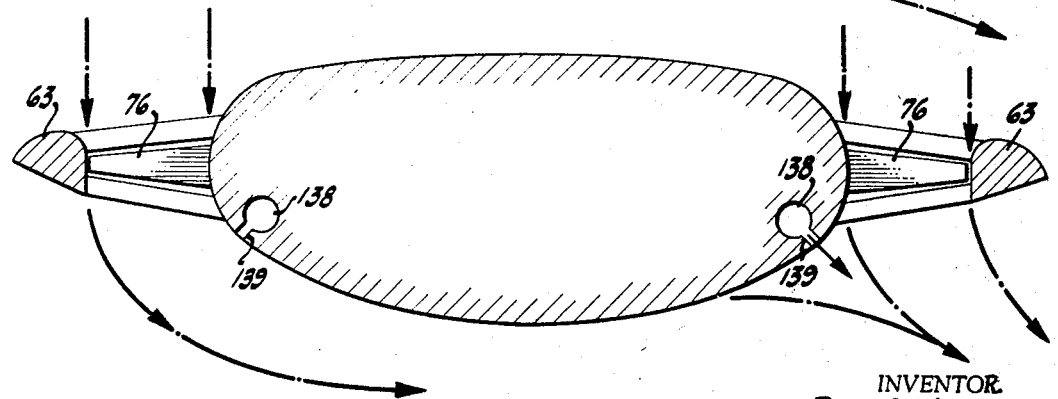

Nov. 12, 1968  P. S. MOLLER  3,410,507
AIRCRAFT

Filed May 6, 1966  5 Sheets-Sheet 5

INVENTOR.
PAUL S. MOLLER
BY
Lothrop & West
ATTORNEYS

United States Patent Office 3,410,507
Patented Nov. 12, 1968

3,410,507
AIRCRAFT
Paul S. Moller, 1308 B St.,
Davis, Calif. 95616
Filed May 6, 1966, Ser. No. 548,256
7 Claims. (Cl. 244—23)

ABSTRACT OF THE DISCLOSURE

An aircraft has a central, passenger carrying nacelle with an outer surface defining a figure of revolution about a central vertical axis. A shell surrounding and spaced from the nacelle defines a passageway open at the top and bottom. An engine in the nacelle drives a fan in the passageway forcing air downwardly in the passageway to support the aircraft.

---

My invention relates to aircraft particularly of the type in which a load carrying body is sustained by a downwardly directed column or jet or cushion of air and in which directional control is achieved by varying the direction of the air flow in some fashion. Some vehicles of this nature are designed primarily for use quite close to the ground, so that the effect of air flow between the vehicle and the ground must be taken into account, whereas other vehicles of this general nature may or may not be designed to operate as ground effect machines close to the ground, but are designed to rise to considerably greater heights and far enough from the ground so that there is no or no substantial ground effect.

Aircraft of this general nature are known, but there has been considerable difficulty in providing effective and sufficient controls for such aircraft to maintain them in the desired attitude, to make them control well and to make sure that they are adequately stable.

It is therefore an object of my invention to provide an aircraft of this sort in which stability is satisfactory and sufficient.

Another object of the invention is to provide an aircraft of this character which is readily controlled.

A further object of the invention is to provide an aircraft of this nature in which the air flow is effective and efficient.

A still further object of the invention is to provide an improved arrangement of the various mechanical parts of the aircraft for appropriate performance.

A still further object of the invention is to provide an aircraft which is satisfactorily immune to danger due to malfunction of some of the parts.

A still further object of the invention is to provide an aircraft of this character which can operate well close to the ground and also at a great distance above the ground.

A further object of the invention is in general to provide an improved aircraft of the mentioned type.

Other objects together with the foregoing are attained in the embodiments of the invention described in the accompanying description and illustrated in the accompanying drawings, in which:

FIGURE 3 is a cross section, to an enlarged scale, of the aircraft of FIGURE 1, the plane of section being indicated by the line 3—3 of FIGURE 1;

FIGURE 4 is a partial bottom plan of the structure of FIGURE 3 to the same enlarged scale;

FIGURE 5 is a cross section, the plane of which is indicated by the line 5—5 of FIGURE 4;

FIGURE 8 is a cross section, the plane of which is indicated by the line 8—8 of FIGURE 6, showing one form of control mechanism to an enlarged scale;

FIGURE 9 is a view similar to FIGURE 8 but showing a different form of control mechanism;

FIGURE 10 is a view similar to FIGURES 8 and 9 showing a further modified form of control mechanism;

Figure 1:
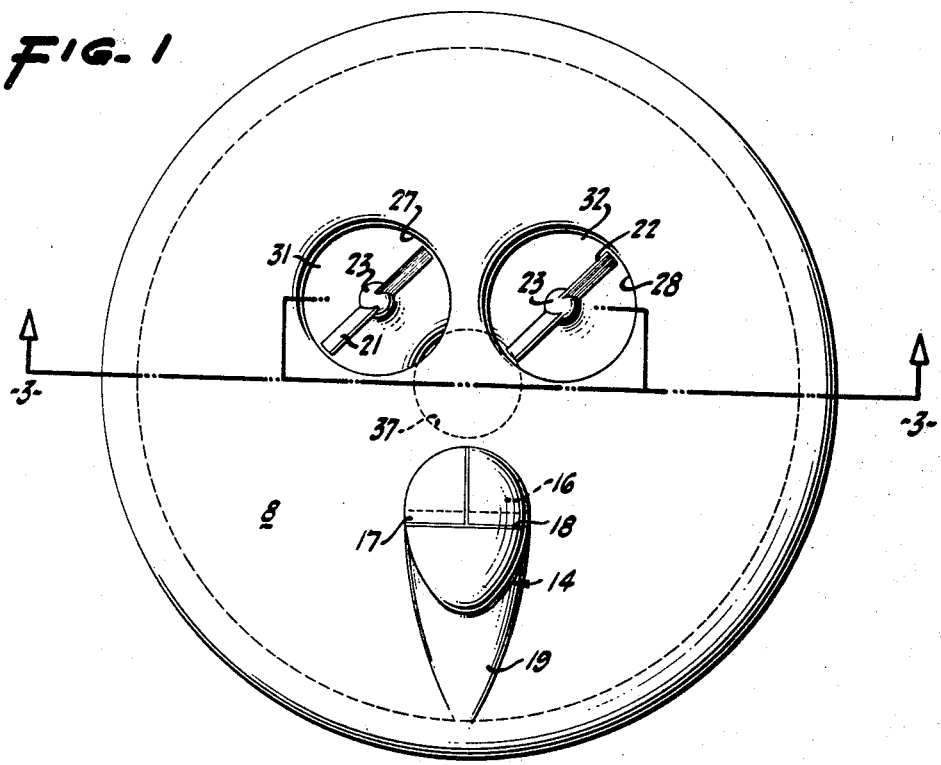
FIGURE 1 is a top plan of an aircraft in accordance with one form of the invention.
Figure 2:
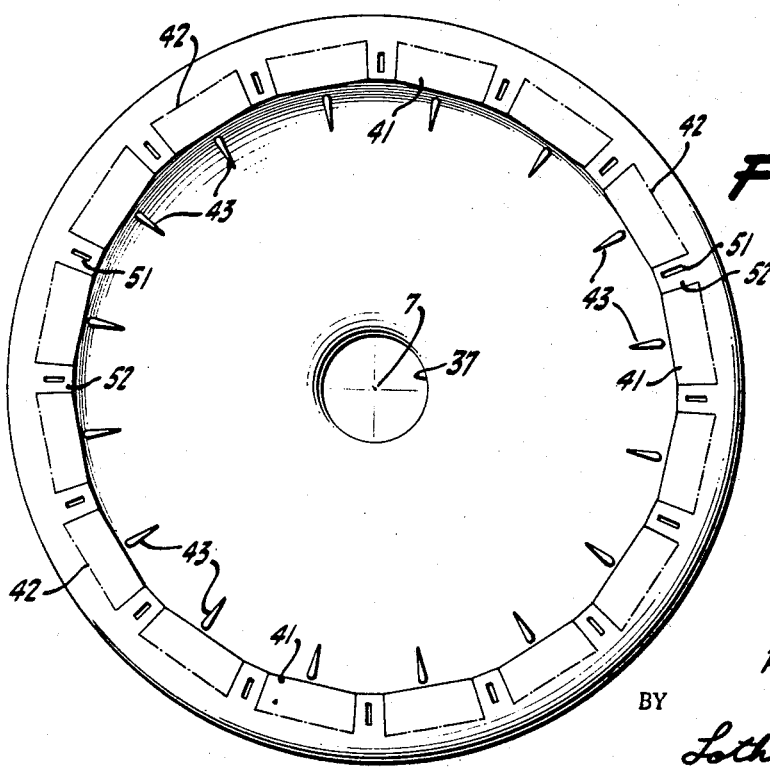
FIGURE 2 is a bottom plan of the aircraft of FIGURE 1.
Figure 6:
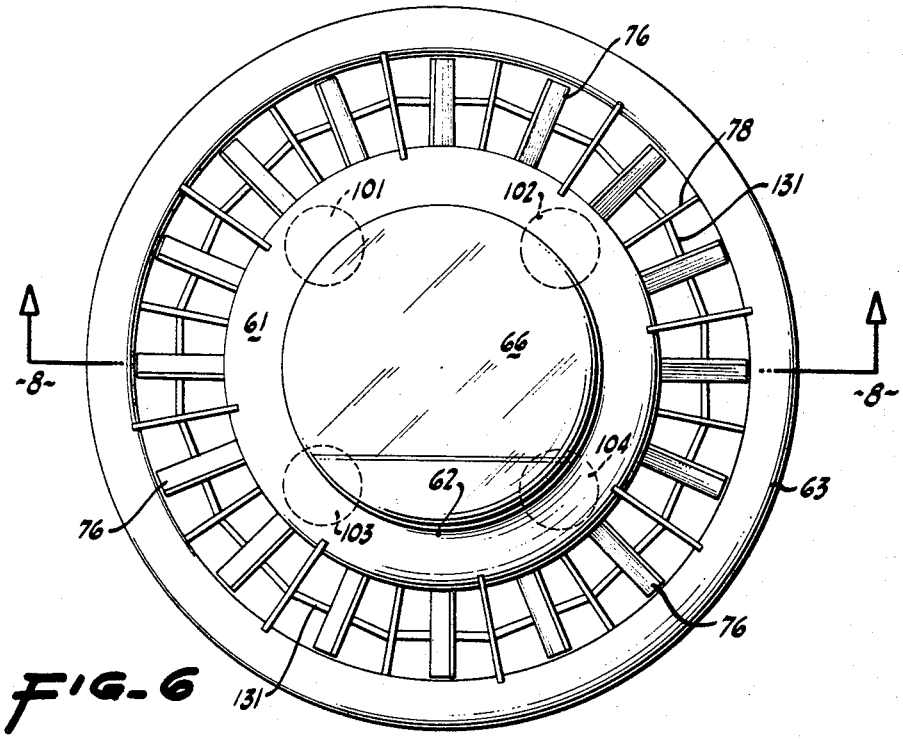
FIGURE 6 is a top plan of an aircraft pursuant to another form of the invention.
Figure 7:
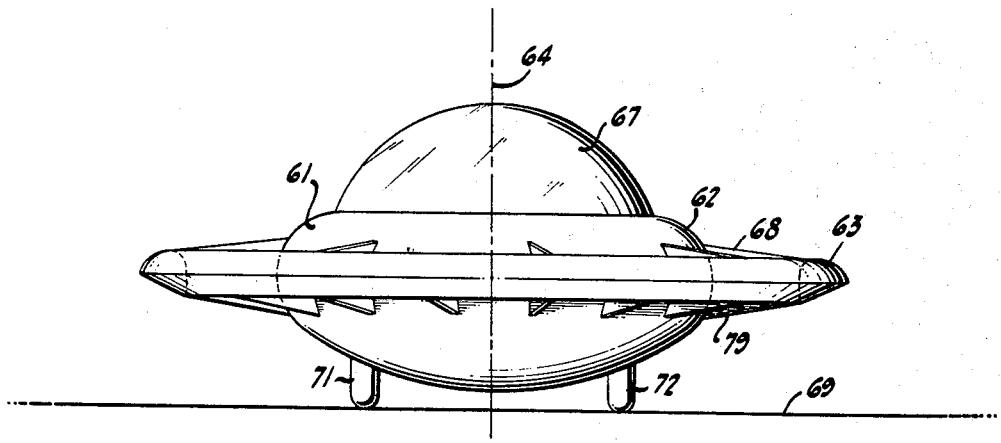
FIGURE 7 is a front elevation of the aircraft illustrated in FIGURE 6.

In the first of the preferred forms of the invention, which has been satisfactorily flown at Davis, Calif., there is provided an aircraft particularly designed to carry one passenger and for use close to the ground. This aircraft includes a main frame 6 comprised of various structural members, sheets and covers arranged generally to provide a rigid figure of revolution about a vertical axis 7. The external, upper configuration is generally defined by a conical surface 8 and by an inturned partially toroidal peripheral surface 9 leading to the vicinity of a substantially planar and usually horizontal lower or bottom surface 11 designed to rest near or to operate a short distance above the indicated planar surface 12 of the ground. The construction described in the main affords continuous enclosing surfaces.

There are some interruptions in the central or nacelle portion of the upper cone 8. One interruption provides an operator's cockpit 14 affording a seat or station 16 for the operator. This station is enclosed in part by a transparent hood 17 having appropriate braces 18 and faired by an appendage 19 into the surface of revolution of the craft. The hood 17 is movable so that the operator can enter and leave without difficulty by moving over the surface of the cone 8.

Supported on the frame 6 in the central nacelle and in symmetrical relationship with the axis 7 and preferably just behind the operator's station are a pair of suspension fans or propellers 21 and 22. Each of these is provided with a driven hub 23 connected by appropriate shafting 24 to an individual propelling engine 26 likewise mounted on the frame 6. Preferably the propellers or fans are disposed in substantially the same horizontal plane and are substantial duplicates in all aspects. Each of the fans is provided with one of a pair of individually contoured entrance ducts 27 and 28 merging with the outer surface of the aircraft so that the air flow to the fans is over smoothly configured surfaces and from the upper portion of the cone 8.

The fans 21 and 22 both discharge generally downwardly parallel to the axis 7 into initially individual ducts 31 and 32. These promptly merge into a single air passage 33 which for the most part extends circumferentially around the interior of the cone. The duct walls defining the passage 33 are carefully configured for efficient air flow toward the outer periphery of the enclosure. From the rim the duct walls are inflected inwardly all around the lower periphery of the structure so that the passage 33 discharges the guided air generally in a radially inward and slightly downward direction beneath the lower surface 11 of the frame 6.

Although it is not always utilized, it is in many instances advantageous, particularly if central turbulence beneath the surface 11 is excessive, to provide in addition to the passage 33 a central, downwardly directed conduit 37 symmetrical with the axis 7. The walls of the conduit 37 merge smoothly with the bottom surface 11. Air discharged by the conduit 37 acts as a stabilizer. It blocks or diverts inward air flow, precludes cross flow and alleviates central turbulence. In general, the air flow from the fans 21 and 22 is as shown by the various arrows in FIGURE 3 when the craft is on or near the ground.

In order to control the efflux of the air from the passage 33 at various circumferential points around the lower, annular discharge openings, the inwardly directed portion 9 of the body, which also is a duct wall of the passage 33, is provided with a number of substantially identical, inwardly directed flaps 41. These are arranged in a circle and each is provided with a hinge connection 42 to the frame 6 of the machine. The flaps are individually pivoted about their individual hinges 42 to approach and receded from the bottom wall 11. They thus govern the amount of air discharging from the passage 33 at the individual flap stations around the periphery of the machine. The flaps 41 are connected to a control instrumentality (not shown) at the operator's station so that the operator can regulate the amount of opening of each of the flaps 41 individually or in groups as desired and can thus discharge more or less air from any selected portion of the device and can vary the air direction to a limited extent.

The discharged air flows between the ground surface 12 and the bottom 11 and over a number of yaw controllers 43 projecting downwardly from the bottom 11 of the framework. With a structure of this sort and as so far described, the operator can control the efflux of the pumped air around the lower periphery of the frame so that he has little difficulty in controlling the attitude of the vehicle when the vehicle is at a short distance above the ground. Since the inwardly directed air flow or streams passing over the flaps 41 may cause considerable turbulence, particularly under the central portion of the vehicle, it is in many instances desirable to permit air to flow also through the vertically downwardly directed jet 37 so that some of the turbulence is obviated and a more stable air column, cushion or platform is provided for the vehicle.

Despite the foregoing, there may still be control difficulty. Particularly when the vehicle is very close to the ground, if its horizontal attitude is altered by tipping so that the periphery is closer to the ground at one point than at another, the discharging air which reverses and escapes outwardly under the flaps 41 between the lower surface of the flaps and the ground generates a locally pronounced Bernoulli effect. The low portion of the vehicle rim, or the flaps 41 that are closer to the ground than the others, tends to have the air flowing thereunder at a somewhat higher velocity and lower pressure. This lessens the vertical support under the already lower portion of the vehicle rim and aggravates the tilt or improper attitude of the craft. This effect becomes increasingly pronounced as the vehicle approaches the ground surface 12 and may cause serious difficulties. Some of this effect can be obviated by extremely precise control of the flaps 41, but it is usually not practical to provide a sufficiently accurate control, particularly in a relatively small, inexpensive machine.

I have found in actual operation that the Bernoulli effect of importance close to the ground can be largely and practically obviated by the provision of permanently open slots 51 cut through the inturned lip 52 beneath the main body of the machine and extending between the spaced flaps 41. It is also possible, if the edges of the flaps 41 are sufficiently accurately and closely spaced, simply to omit the inturned lip 52 therebetween and thus to leave narrow open spaces equivalent in area to that of the slots 51. When I refer to slots herein, I intend to refer to either construction or to any construction which allows a continuous or permanent generally vertically downward escape or discharge of air beneath the lower peripheral surface of the aircraft.

With this arrangement I have found that a small fraction of the total air in the passage 33 discharges through the slots 51 or their equivalents in an approximately vertical direction. This discharge is adequate to prevent any deleterious Bernoulli effect beneath the vehicle. Even though one portion of the lower periphery of the vehicle should be too close to the ground and would normally tend to aggravate the Bernoulli effect, the downwardly flowing peripherally arranged air jets alleviate the Bernoulli effect and obviate the instability of the craft under those circumstances. While the slots 51 are all shown of substantially the same size herein, they can vary in effective area or in number in different parts of the lower periphery of the body.

The loads on the craft are generally arranged for good balance. For example, the engines 26 and fans 21 and 22 are displaced rearwardly to offset the eccentric loading at the forward operator's station 16. The forward lip of each duct 27 and 28 in forward flight is thus on or near a diameter of the craft. This rearward location of the air intake structure thus eliminates or reduces nose-up moments. Yet, variations in live load, particularly their effect when the craft is near the ground, may cause some tipping and accentuation of the Bernoulli effect. The slots 51 can be particularly designed and arranged to compensate for any net eccentric load.

In order to make the vehicle safer, the area of efflux for air both from the central conduit 37 and from the peripherally discharging passageway 33, particularly when the open slots 51 are taken into account, is always made greater than the area for influx of the air to either one of the propellers 21 and 22. Each of the engines 26 has its own complete system, so that the failure of one of the engines in flight does not affect the operation of the other. Since the area for outflow of air from one propeller beneath the machine is considerably greater than the area for flow past the other, dead propeller, there is no reversal of air flow or back flow through an inlet. Even though but one propeller is operating, its entire output travels downwardly and discharges beneath the craft as designed. Thus, while there is some loss of support when one engine fails, there is no tendency for an upwardly directed air jet to interfere with the vehicle operation.

The form of the invention just described is particularly used in close proximity to the ground and while it can rise to some height thereabove, it is not efficiently designed for that use. The form of the invention shown in FIGURES 6–12 inclusive is designed to make but small use of ground effect and to make much larger use of momentum thrust effect and to rise to substantial heights above the ground.

In this latter instance, the aircraft includes a body and framework 61 constructed similarly to the preceding arrangement. There is provided generally a nacelle 62 and a spaced rim 63 which are both figures of revolution about a central, vertical axis 64. The load carrying portion or nacelle of the vehicle is centrally disposed and is symmetrically located about the axis 64. It takes the form of a passenger and load station 66 closed by a transparent dome 67. The rim 63 is connected to the central body by a plurality of radial struts 68 and the entire vehicle when on the ground 69 is supported on wheels 71 and 72.

The air flow and the resulting air cushion are provided by a plurality of fan blades 76 arranged in radial fashion about a circular fan rim 77 (FIGURE 11) having the axis 64 as a center. The outer ends of the fan blades 76 terminate just short of the approximately vertical inner surface of the rim 63, which, with the body 62, is configured to afford a smooth entrance for air to the upper side of the fan blades. A number of anti-swirl vanes 78 are extended between the rim 63 and the nacelle 62 to serve as guides for the entering air. The vanes are disposed to cancel the torque or rotational effect of the air passing through the device.

Supplementing the upper, anti-swirl vanes 78 there may be a plurality of lower, anti-swirl vanes 79 deflecting the fan-discharged air for the same purpose. Either the upper vanes 78 or the lower vanes 79 may be omitted, provided that the design of the remaining set is suitably adjusted. The net result is to provide an appropriate air flow into, through and from the craft so that in normal operation the nacelle 66 remains stationary and does not rotate about the vertical axis 64.

Figure 11:
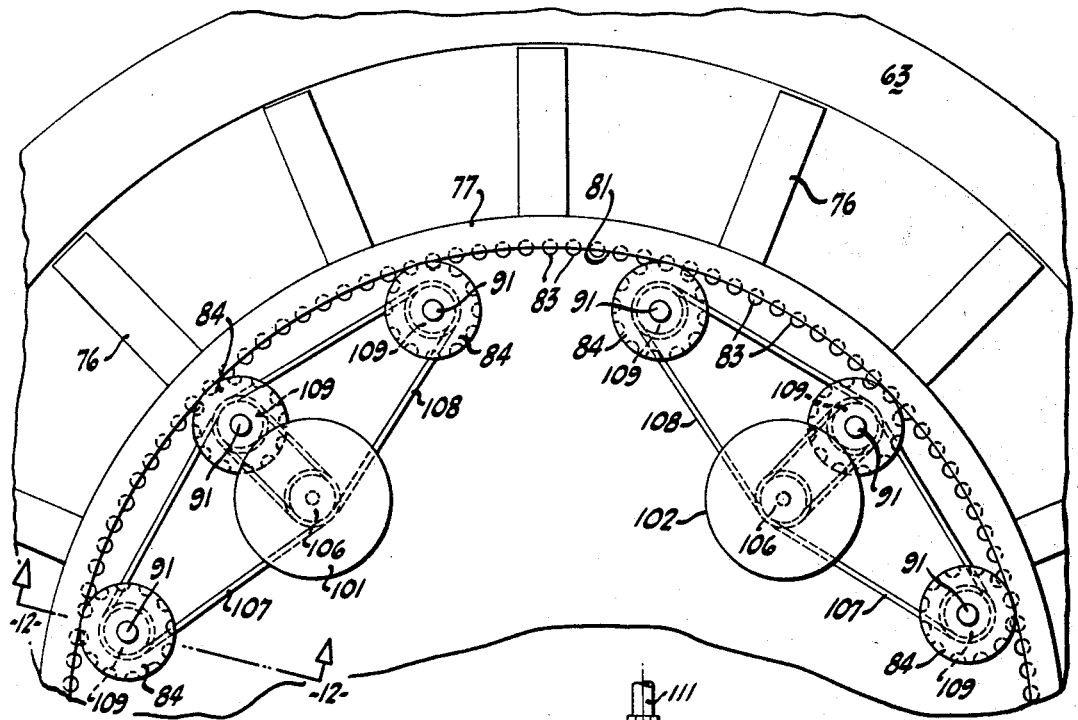
FIGURE 11 is an enlarged view of a part of the structure in plan with portions removed to illustrate a drive arrangement.
Figure 12:
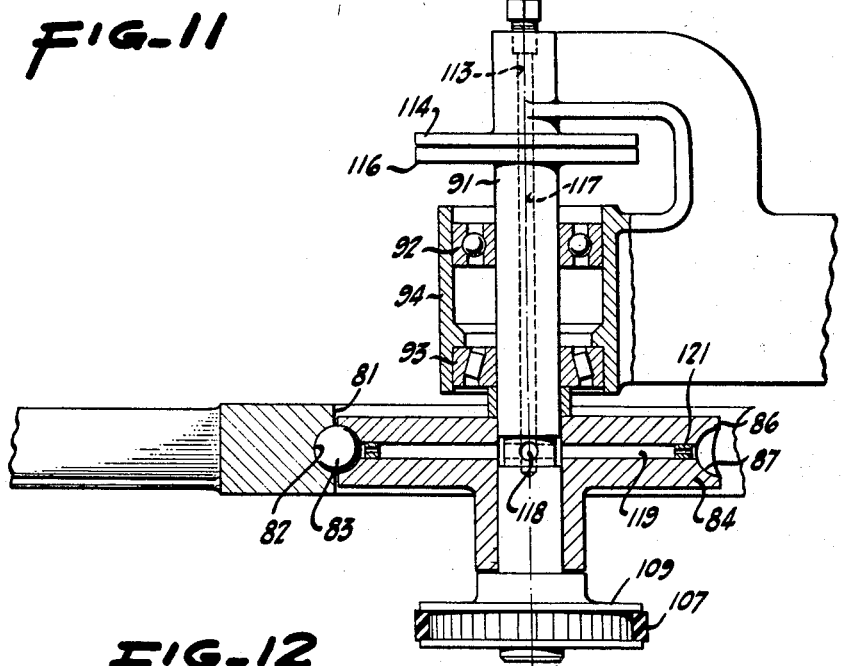
FIGURE 12 is a cross section, the plane of which is indicated by the line 12—12 of FIGURE 11.

In order to afford an appropriate mounting and driving means for the fan blades 76, the inner fan rim 77 is both supported and propelled by the arrangements shown in FIGURES 11 and 12. The inner rim 77 is formed on its interior cylindrical surface 81 with a number of approximately hemispherical depressions 82 into each of which a sphere or ball 83 is permanently fastened, leaving about half of the ball to project. At appropriate points (in this case, twelve) on the framework of the body 61 there are mounted driving pinions 84 having a circular cylindrical outer surface 86. At intervals the pinions have hemispherical depressions 87 designed to interfit with the balls 83 as the pinions rotate. Because of the interengagement of the balls 83 and of the hemispherically depressed pinion, load is transmitted between the rim 77 and the pinion 84 not only in a rotary sense but also in radial and vertical directions. That is, the pinion is not only a driving member for the rim 77, but is also a radial and axial supporting member therefor.

As particularly indicated in FIGURE 11, a number of pinions 84 are evenly spaced about the interior periphery of the rim. Each of the pinions 84 is carried on a vertical shaft 91 at least partially confined and supported by bearings 92 and 93 in a bearing cage 94 connected to part of the framework 6. Each group of the pinions 84 is appropriately driven from an adjacent one of a plurality of engines 101, 102, 103 and 104. Each of these engines is entirely independent of the others. Any one can be operated even though all of the others fail. Each of the engines carries a drive pulley 106 around which belts 107 and 108 are trained. These belts are also trained in generally triangular drives around belt pulleys 109 at the bottom of the shafts 91, each of the engines driving its group of three of the twelve pinions. By this means, the fan is not only located and supported, but is engine rotated.

Because lubrication and the bearing loads in this environment present some problems, I prefer to utilize some air bearings. From an appropriate air compressor on the vehicle (not shown) air under pressure is led through a number of tubes such as the tube 111 in FIGURE 12 to a central bore 113 in part of the framework 6. Some of the air escapes between a stationary disk 114 forming part of the framework and a subposed rotary disk 116 at the upper end of the shaft 91, thus providing an air thrust bearing. A remaining portion of the air from the duct 113 continues through a bore 117 in the shaft 91 and then travels through a central manifold 118. From there the air flows radially through channels 119 to the hemispherical recesses 87 and thus escapes around the individual balls 83. Preferably the channels 119 are provided with exit restrictions 121. Despite the fact that some of the channels are open for much of their cycle of rotation, there is still pressure in the system of sufficient magnitude to ensure an air bearing between each hemispherical surface 87 and the adjacent ball 83 as the positioning, support and drive loads are imposed.

With this arrangement, when one or more of the engines is in operation, the fan is rotated about the axis 64 and drives a current of air of annular envelope configuration in a generally downward direction. This air is variously deflected in order to maneuver and control or stabilize the vehicle. For that reason, there may be situated in the outflow of the fan 76 a ring or plurality of deflectors 131 (FIGURE 8) symmetrical about the axis 64 and designed to be rocked about horizontal axes 132 and to swing through a vertical position and to both sides thereof under the control of an instrumentality (not shown) in the operator's station. As illustrated in FIGURE 8, the vanes 131 are tilted so as to deflect the air flow laterally to the right. The configuration of the underbody of the vehicle is such that a deflector inclination, as shown, tends to discharge the outgoing air in a direction having a downward component and also having a substantial lateral component. While some turbulence exists particularly near the confluence of the air flowing beneath the body and that flowing more nearly downwardly, there is a sufficient net, lateral reaction to produce side maneuverability of the body. By tilting one or various groups of the several vanes 131, the operator may deflect the downflowing stream in any desired direction in order to give him directional control of his vehicle and also to assist him in preventing any instability, such Bernoulli effect instability, upon close approach to the ground.

As an alternative to the vanes 131, there may be provided, as shown in FIGURE 9, a number of spoilers 136 symmetrically disposed in a ring about the axis 64 and also arranged to swing on horizontal axes 137 beneath the body of the vehicle. The spoilers 136 are so mounted as to be nested within the configuration of the body and in effect to continue its streamlined configuration in one extreme position. When one or more of the spoilers is moved about its axis 137, it projects into the downflowing air stream. Normally, the interior portion of the annular stream tends to follow the configuration of the vehicle body and to emerge symmetrically along the axis 64 extended downwardly. However, as shown in FIGURE 9, one or more of the spoilers to the right-hand side of the figure have been projected from their recessed position and hence deflect the adjacent air flow toward the right. This flow reduces the pressure beneath the body of the vehicle and tends to cause an accompanying transverse flow beneath the vehicle body. The function of the spoiler installation is virtually the same as that of the deflecting vanes shown in FIGURE 8.

As another control alternative, in place of the vanes 131 or of the spoilers 136, I may provide auxiliary power jets of air. As particularly illustrated in FIGURE 10, the body contains a manifold 138 from which individually controlled ducts 139 extend to the surface of the body. The individual ducts can be controlled from the operator's station. When the ducts toward the right, as shown in FIGURE 10, are opened and the remaining ducts toward the left as shown in that figure are closed, air issuing from the open ducts tends to deflect the main stream of air to the right as before, inducing flow from the left-hand side of the machine beneath the body to join the right-hand flow. The result of this structure is about the same as with the structures of FIGURES 8 and 9. In all of these instances, the operator is accorded means for controlling the direction of discharge or efflux of the normally downwardly flowing air cushion or stream so that the vehicle is readily maneuverable in the selected directions and so that compensation can be made for any local or temporary instability.

With the central nacelle, the operator and the removable load are generally symmetrically and centrally located so that variation in their weight does not disrupt the stability or attitude of the machine. It has been found that with this arrangement there is sufficient lift, stability and maneuverability to permit the machine to rise from the ground without disturbing ground effect and to maneuver at substantial altitudes far enough away from the ground so that ground effect is immaterial.

The large rotor, of which the fan blades 76 are a part, is rotated rapidly enough to provide a pronounced gyro-stabilizing effect. This is augmented by the similar effect of the drive pinions and their coupled engines. While the diameter of these latter rotating parts is not great, they turn at relatively high speed so that all of their gyro-stabilizing effects occur in effective amounts and about appropriate axes.

What is claimed is:

1. An aircraft comprising a central nacelle having an outer surface that substantially defines a figure of revolution about a central vertical axis, an outer shell surrounding said nacelle and spaced therefrom to leave an intervening passageway open at the top and at the bottom and that is substantially annular in any plane normal to said axis, means for connecting said outer shell to said nacelle, a ring surrounding said nacelle, fan blades on said ring extending outwardly therefrom substantially across said passageway, means in said nacelle for accommodating a passenger and at least one engine, an engine driven shaft in said nacelle rotatable about a vertical shaft axis fixed in said nacelle, and interfitting drive members connecting said engine driven shaft and said ring to rotate said ring and said fan blades about said central vertical axis in a direction to force air downwardly in said passageway from the top to the bottom thereof.

2. An aircraft as in claim 1 in which said interfitting drive members also hold said ring and said nacelle against relative displacement along said vertical axis.

3. An aircraft as in claim 1 in which said interfitting drive members include balls on one of the members and hemispherical sockets of a similar size on the other of the members.

4. An aircraft as in claim 3 in which said interfitting drive members are sized to allow an air film between them.

5. An aircraft as in claim 1 in which a plurality of anti-swirl vanes fixed to said nacelle extend substantially across said passageway.

6. An aircraft as in claim 1 in which said outer surface of said nacelle extends downwardly and inwardly toward said central axis, and means are provided for deflecting the air flow thereover.

7. An aircraft as in claim 6 in which said deflecting means is an outlet for an air stream.

References Cited

UNITED STATES PATENTS

| | | | |
|---|---|---|---|
| 3,124,323 | 3/1964 | Frost | 244—12 |
| 2,718,364 | 9/1955 | Crabtree | 244—12 |
| 3,170,529 | 2/1965 | Kelley et al. | 244—23 |
| 3,276,723 | 10/1966 | Miller et al. | 244—12 |
| 3,291,236 | 12/1966 | Foshag | 114—671 |

FOREIGN PATENTS 678,700    1/1964    Canada.

MILTON BUCHLER, *Primary Examiner.*

T. W. BUCKMAN, *Assistant Examiner.*